(12) United States Patent
Piotrowski et al.

(10) Patent No.: US 10,201,942 B2
(45) Date of Patent: Feb. 12, 2019

(54) METHOD FOR PRODUCING AND COATING A LENS

(71) Applicant: Interglass Technology AG, Cham (CH)

(72) Inventors: Daniel Piotrowski, Steinhausen (CH); Rene Josef Ulrich, Weggis (CH)

(73) Assignee: Interglass Technology AG (CH)

( * ) Notice: Subject to any disclaimer, the term of this patent is extended or adjusted under 35 U.S.C. 154(b) by 194 days.

(21) Appl. No.: 15/356,467

(22) Filed: Nov. 18, 2016

(65) Prior Publication Data

US 2017/0144391 A1  May 25, 2017

(30) Foreign Application Priority Data

Nov. 19, 2015  (CH) ........................... 1688/15

(51) Int. Cl.
*B29C 39/02* (2006.01)
*B29D 11/00* (2006.01)
*B29L 11/00* (2006.01)

(52) U.S. Cl.
CPC ........ *B29D 11/00009* (2013.01); *B29C 39/02* (2013.01); *B29D 11/00413* (2013.01); *B29D 11/00865* (2013.01); *B29L 2011/0016* (2013.01)

(58) Field of Classification Search
None
See application file for complete search history.

(56) References Cited

U.S. PATENT DOCUMENTS

| 4,166,088 A | 8/1979 | Neefe |
| 4,251,474 A | 2/1981 | Blandin |
| 5,730,911 A * | 3/1998 | Cano ............... B29C 39/006 264/1.1 |
| 5,914,193 A * | 6/1999 | Ono ................ B29D 11/00 427/164 |
| 2007/0229756 A1 | 10/2007 | Mandler et al. |
| 2007/0252294 A1 | 11/2007 | Tsuji |

FOREIGN PATENT DOCUMENTS

| DE | 102005001611 A1 * | 7/2006 | ............. B29C 39/12 |
| WO | 02/087861 A2 | 11/2002 | |

OTHER PUBLICATIONS

DE102005001611 Googe Patents Translation Performed Jul. 26, 2018. (Year: 2018).*

* cited by examiner

*Primary Examiner* — Lisa L Herring
(74) *Attorney, Agent, or Firm* — CanaanLaw, P.C.; David B. Ritchie

(57) ABSTRACT

A method for producing and coating a lens includes:
 applying a curable paste along the edge of a first molding shell and along the edge of the second molding shell,
 connecting the two molding shells by means of a sealing element to form a unit,
 casting a monomer into the unit,
 curing the monomer and the paste so that the lens is formed,
 detaching the sealing element from the unit,
 separating the lens from the two molding shells,
 placing the lens in a vacuum chamber of a vacuum-coating installation, and
 coating an optical surface of the lens, wherein no washing process is carried out between the step of separating the lens from the two molding shells and the step of placing the lens in the vacuum chamber.

2 Claims, 3 Drawing Sheets

METHOD FOR PRODUCING AND COATING A LENS

PRIORITY CLAIM

Figure 1:
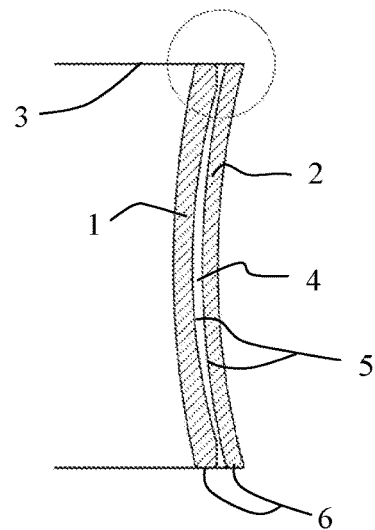

Applicant hereby claims foreign priority under 35 U.S.C § 119 from Swiss Application No. 1688/15 filed Nov. 19, 2015, the disclosure of which is herein incorporated by reference.

FIELD OF THE INVENTION

The invention relates to a method for producing and coating a lens, in which the lens is produced by casting and is subsequently coated in a vacuum-coating installation.

BACKGROUND OF THE INVENTION

Such a lens is a semi-finished product, from which subsequently a spectacle lens is cut out and fitted into a spectacle frame, for example by an optician.

Methods for producing a lens by casting are known for example from U.S. Pat. No. 4,251,474 and WO 02/087861. In this production method, a monomer is cast into a cavity bounded by two molding shells and a seal and is polymerised therein, so that in doing so the lens is created. The seal is then removed and the lens is separated from the two molding shells. The lens can then be provided with optical layers, e.g. with antireflection layers, anti-scratch layers etc, in immersion baths or in a vacuum-coating installation such as a PECVD installation.

The cast lenses mostly have a protruding projection along their circumference which is brittle and can therefore easily be damaged. In order to ensure that detached splinters do not reach the optical surface of the lens during the subsequent coating by means of a process in which the layers are applied in a vacuum-coating installation, the lenses need to be cleaned in one or several washing processes prior to placement in the vacuum chamber.

SUMMARY OF THE INVENTION

It is an object of the invention to improve the production and coating of lenses.

A method for producing and coating a lens according to the invention comprises the following steps:
  applying a curable paste along the edge of a first molding shell and along the edge of the second molding shell,
  connecting the two molding shells by means of a sealing element to form a unit,
  casting a monomer into the unit,
  curing the monomer and the paste so that the lens is formed,
  detaching the sealing element from the unit,
  separating the lens from the two molding shells,
  placing the lens in a vacuum chamber of a vacuum-coating installation, and
  coating an optical surface of the lens, wherein no washing process is carried out between the step of separating the lens from the two molding shells and the step of placing the lens in the vacuum chamber.

Preferably, the paste meets the following criteria: The paste consists of a material which has a sufficiently high viscosity so that the paste applied to the molding shells does not trail away, does not gas out and connects to the monomer or the lens during curing and is rubber-like in the cured state.

BRIEF DESCRIPTION OF THE DRAWING FIGURES

The accompanying drawings, which are incorporated into and constitute a part of this specification, illustrate one or more embodiments of the present invention and, together with the detailed description, serve to explain the principles and implementations of the invention. For the sake of clarity, the figures are not drawn to scale.

Figure 2:
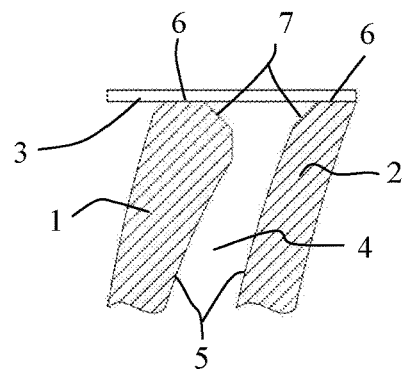
Figure 3:
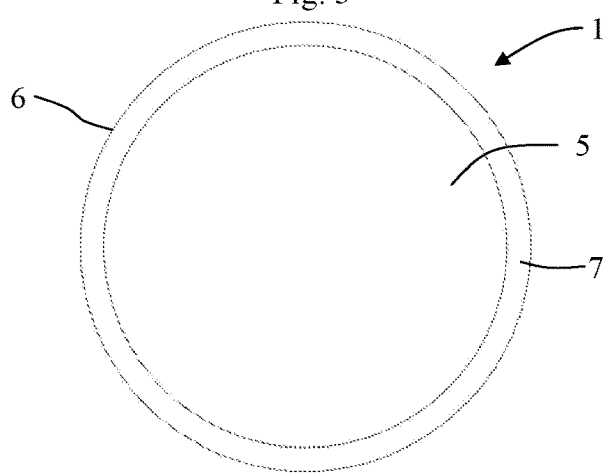
Figure 4:
Figure 5:
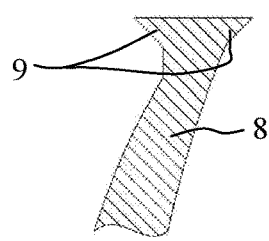
Figure 6:
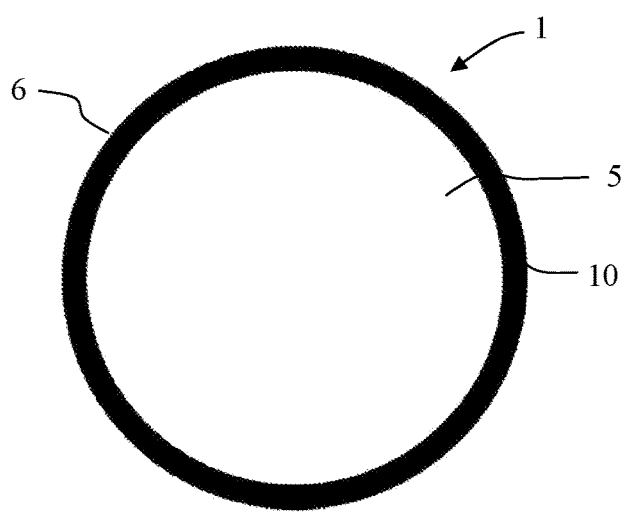
Figure 7:
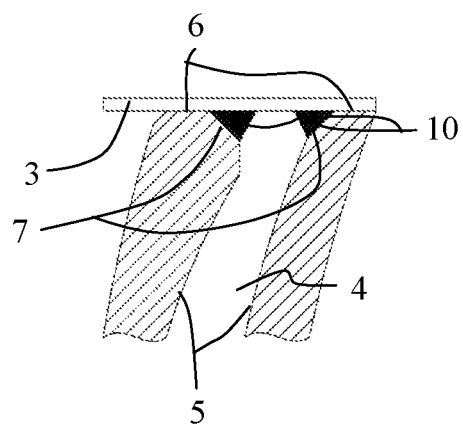
Figure 8:
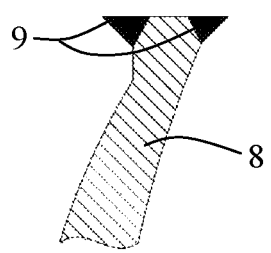

In the drawings:
  FIG. 1 shows two mutually opposite molding shells, which are connected to form a unit by means of a sealing element;
  FIG. 2 shows an enlarged sectional view of FIG. 1;
  FIG. 3 shows a molding shell with a chamfer;
  FIG. 4 shows a lens;
  FIG. 5 shows an enlarged sectional view of FIG. 4;
  FIG. 6 shows a molding shell in a top view, along the edge of which a paste has been applied;
  FIG. 7 shows the unit in a cross-sectional view, and
  FIG. 8 shows a sectional view of the lens produced by means of the method in accordance with the invention.

FIG. 1 shows two mutually opposite molding shells 1 and 2, which are connected to form a unit by means of a sealing element 3. The sealing element 3 is preferably a tape. The sealing element 3 can also be an element known in the field as a "gasket", which consists of rubber or a rubber-like material. The two molding shells 1 and 2 and the sealing element 3 delimit a cavity 4. The two moulding-molding shells 1 and 2 contain a surface facing the cavity 4, which will be referred to below as the optical surface 5, because these two surfaces 5 delimit the surfaces of the lens to be produced. FIG. 2 shows an enlarged sectional view of the portion of FIG. 1 which is marked by a circle. The illustration shows that the transition from the side edges 6 to the optical surfaces 5 in the two moulding-molding shells 1 and 2 is formed by a chamfer 7. The transition is thus chamfered. FIG. 3 shows the surface 5 of the molding shell 1 facing the cavity 4, wherein the chamfer 7 is shown in a broader way for reasons of clarity of the illustration.

As shown in FIG. 4, the lens 8 produced by means of such a unit contains along its edge on both sides a respective projection corresponding to the chamfers 7 of the molding shells 1 and 2. FIG. 5 shows an enlarged sectional view of FIG. 4. Since the cured material from which the lens 8 is produced is relatively brittle, splinters repeatedly break away from the projections 9 during the subsequent machining steps. The lens 8 must therefore be washed carefully in order to remove any splinters prior to coating by means of a vacuum-coating method in which the coating of coatings is/are applied in a vacuum chamber.

The method which will be described below in closer detail produces a lens which has such a projection, but said projection consists of a rubber-like and therefore non-brittle material, so that there is no risk that splinters will break off. For this reason, it is possible to omit one or several washing processes prior to the introduction of the lens into the vacuum chamber of the coating system.

The method in accordance with the invention for producing a lens by casting and coating the lens by means of a vacuum-coating method comprises the following steps:

1. Applying a curable paste 10 along the edge of the first molding shell 1 and along the edge of the second molding shell 2.

FIG. 6 shows a top view and an illustration not true to scale of the first molding shell 1 with the applied paste 10, wherein the paste 10 is shown in a broader way for reasons of clarity of the illustration. The paste 10 is situated at the transition point between the optical surface 5 and the side edge 6, i.e. on the chamfer 7 (FIG. 2). The paste 10 is applied for example in that the molding shell 1 rotates and the paste is supplied by means of a syringe that can be pressurised. The paste 10 can be spread by means of a doctor blade if necessary in such a way that the paste 10 completely covers the chamfer 7.

2. Connecting the two molding shells 1 and 2 by means of a sealing element 3 to form a unit.

FIG. 7 shows an enlarged sectional view of the unit in a cross-sectional view. The paste 10 is dimensioned and distributed in such a way that the monomer is unable to flow past the paste 10 during pouring.

3. Pouring the monomer into the unit.
4. Curing the monomer and the paste 10.

The curing is a process in which the monomer polymerises, wherein the lens 8 is formed. The paste 10 preferably consists of a material which cures when the monomer is polymerised. The curing of the monomer and the paste 10 can occur in this case in a single step. It is alternatively possible to cure in two steps at first the paste 10 and then the monomer, or vice versa. The curing of monomer and paste 10 preferably occurs by means of UV radiation, but can also occur in a different way, e.g. by heat in a furnace.

5. Detaching the sealing element 3 from the unit.
6. Separating the lens 8 from the two molding shells 1 and 2.

Corresponding to the chamfers 7 of the two molding shells 1 and 2, the lens 8 has two protruding projections 9 along its side edge 6, as shown in FIG. 8. The two projections 9 consist of the cured material of paste 10 however.

7. Placing the lens 8 in the vacuum chamber of a vacuum-coating installation, and
8. Applying one or more optical layers on at least one of the two optical surfaces of the lens 8, wherein no washing process is carried out between the step of separating the lens 8 from the two molding shells 1 and 2 and the step of placing the lens 8 in the vacuum chamber.

Possible vacuum-coating methods are CVD (chemical vapor deposition) methods, especially the PECVD (plasma-enhanced chemical vapor deposition) method and the PACVD (plasma-assisted chemical vapor deposition) method, as well as different PVD (physical vapor deposition) methods, which include for example sputtering, electron beam evaporation, and the pulsed laser deposition (PLD) method. This list is not exhaustive.

The paste 10 consists of a material which meets the following requirements:
It is curable.
It has a sufficiently high viscosity so that the paste 10 applied to the chamfer 7 does not trail way.
It does not gas out so that no mist can be formed which could deposit on the molding shells 1 and 2, which could lead to optical defects of the lens 8.
During curing, it connects to the monomer or the lens 8, respectively, so that during the separation of the lens 8 from the two molding shells 1 and 2 it detaches from the molding shells 1 and 2 together with the lens 8.
It is rubber-like in the cured state.

Materials which meet these requirements are distributed, for example, by the company Dymax under the trade name "Speedmask". These materials are "light curable temporary masking resins".

The projections 9 of the lens 8 produced by this method are rubber-like. Accordingly, there is no risk that splinters will break off While embodiments and applications of this invention have been shown and described, it would be apparent to those skilled in the art having the benefit of this disclosure that many more modifications than mentioned above are possible without departing from the inventive concept described herein. The invention, therefore, is not to be restricted except in the spirit of the appended claims and their equivalents.

What is claimed is:

1. A method for producing and coating an optical lens having an outer circumferential edge, the method comprising:
applying a curable paste along an edge of a first molding shell and along an edge of a second molding shell;
connecting the first and the second molding shell by means of a sealing element to form a unit;
casting a monomer into the unit so that the monomer comes into contact with the curable paste;
curing the monomer and the curable paste into one structure which forms the optical lens and protruding projections, the protruding projections formed of cured, rubber-like and non-brittle paste along the outer circumferential edge of the optical lens;
detaching the sealing element from the unit;
separating the optical lens from the first and the second molding shell;
placing the optical lens in a vacuum chamber of a vacuum-coating installation; and
coating an optical surface of the optical lens.

2. The method according to claim 1, wherein the curable paste consists of a material which has a sufficiently high viscosity so that the curable paste applied to the first molding shell and the second molding shell does not trail away, does not gas out and becomes coupled to the monomer of the optical lens during curing and is rubber-like in the cured state.

* * * * *